United States Patent [19]

Morita

[11] Patent Number: 5,076,713
[45] Date of Patent: Dec. 31, 1991

[54] LINEAR MOTION ROLLING GUIDE UNIT MADE OF RESIN

[75] Inventor: Kunihiko Morita, Koganei, Japan

[73] Assignee: Nippon Thompson Co., Ltd., Tokyo, Japan

[21] Appl. No.: 543,473

[22] Filed: Jun. 26, 1990

[30] Foreign Application Priority Data

Jan. 17, 1990 [JP] Japan .................................. 2-6298

[51] Int. Cl.⁵ ............................................ F16C 29/06
[52] U.S. Cl. .................................................... 384/45
[58] Field of Search ........................... 384/45, 44, 43; 464/168

[56] References Cited

U.S. PATENT DOCUMENTS

| 4,572,590 | 2/1986 | Teramachi | 384/45 |
| 4,701,057 | 10/1987 | Kashiwabara | 384/45 |
| 4,701,058 | 10/1987 | Mottate | 384/45 |

Primary Examiner—Lenard A. Footland
Attorney, Agent, or Firm—Rogers & Killeen

[57] ABSTRACT

There is provided a linear motion rolling guide unit mainly comprising a square pillar-shaped long track rail having rail side track grooves formed in the longitudinal direction on both side surfaces of the rail, and a casing having an inverse U-shaped cross section mounted over the rail through a concave portion with a plurality of rolling members being intervened therebetween. Endless circulating passages for rolling members are provided within the casing or within an assembly of the casing and a pair of side plates, in a symmetrical relation at an angle α, as seen in the cross section of the casing, relative to the longitudinally and centrally extending vertical plane of the track rail. Almost all of the constitutional parts of the linear motion rolling guide unit such as the track rail, casing, side plates, direction turning passage-forming parts for rolling members, and the like are made of high performance engineering plastics such as PEEK resin, PES resin, PPS resin, PI resin, PAI resin, modified PPO resin, PEI resin, and the like, while the rolling members may also be formed not only from plastic resins, but also from stainless steel, glass, ceramics.

13 Claims, 5 Drawing Sheets

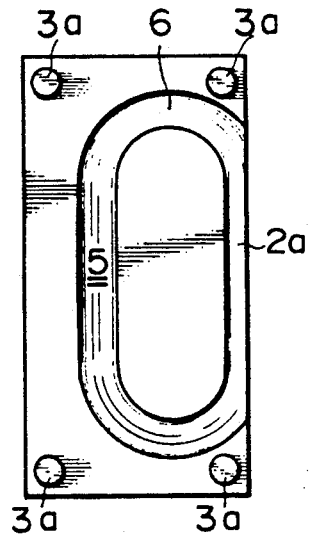
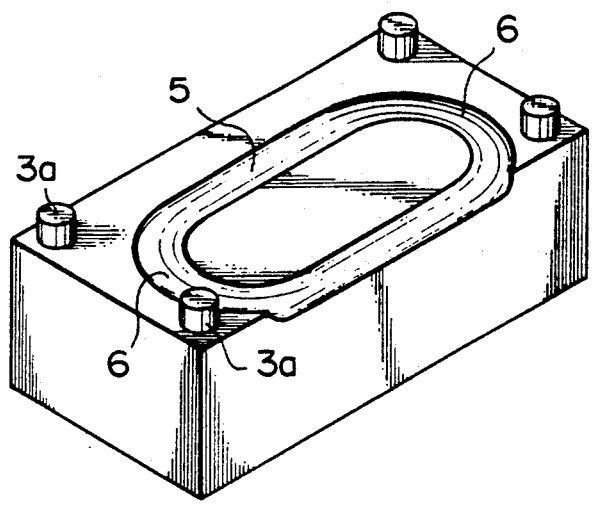
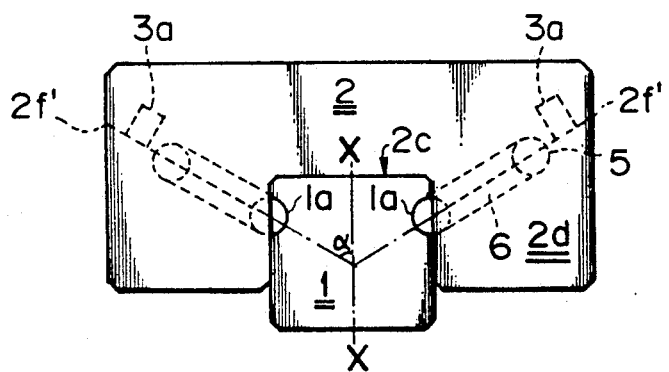
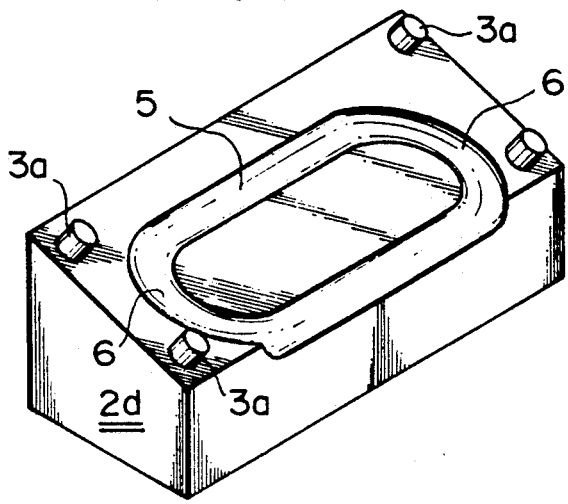

LINEAR MOTION ROLLING GUIDE UNIT MADE OF RESIN

BACKGROUND OF THE INVENTION

1. Field of the Invention

The present invention relates to a linear motion rolling guide unit in which almost all of the component parts are made of what is called high performance engineering plastic resin which is excellent in heat resistance, chemical resistance, and mechanical and physical strengths and, more particularly, to a linear motion rolling guide unit which can effectively be used even in special operational environments, for instance, under severe mechanical and chemical conditions encountering with manufacturing of chemicals, in the vacuum or water such as sea water, and the like.

2. Description of the Related Background Art

In a conventional linear motion rolling guide unit, only limited component parts, for instance, side plates which are attached to both ends in the longitudinal direction of a casing are made of a resin such as POM (polyoxymethylene), PBT, PES, or the like and the other component parts which require a high mechanical strength in operation are made of steel or iron. However, in recent years, various kinds of resins having physical and mechanical strength substantially equal to that of steel have been developed. There has been proposed by the same applicant that the above-mentioned new resinous materials can be used in place of steel from which the conventional parts have been made (Japanese Patent Application No. 211364-1989).

According to the linear motion rolling guide unit made from resin as disclosed in Japanese Patent Application No. 211364-1989, the direction turning passages, return passages, and track surfaces can be easily and accurately positioned so that the slide resistance of the rolling members when they run along the endless ball circulating passages is made small to the maximum extent.

As compared with the unit made of steel, elastic deformation rate is made large, weight is made small, aligning performance is made high, and unit as a whole can withstand severe mechanical and chemical operating conditions.

However, the above-mentioned prior unit has a poor selectivity in operative applications.

Namely, the prior unit has the following disadvantages:

(1) The direction turning passages for rolling members are provided outside the casing body, therefore a pair of side plates are necessary to provide said passages, (2) The rolling circuit planes in the casing defined by the respective endless circulating passages for rolling members which are provided in laterally symmetrical relation with each other in the casing are designed to be positioned at the same level as the corresponding load bearing, casing side track grooves.

(3) The fastening of the side plates onto the longitudinally opposing end wall surfaces of the casing is limited to the so-called snap-fitting engagement consisting of a cylindrical male projection and a projection-receiving female hole mating therewith, (4) The roller members are limited only to balls, and (5) The number of load bearing track grooves between casing and track rail is limited to only two.

The present invention is to provide a linear motion rolling guide unit for aiming at expanding the above-mentioned selectivity in operative applications, thus enabling to meet a wide range of utility.

The improvements brought about by the present invention are as follows:

(1) The direction turning passages for rolling members are provided even within the casing body, therefore any side plates employed in the prior art unit can be eliminated, (2) The rolling circuit planes in the casing defined by the laterally the respective endless circulating passages for rolling members may be positioned, as seen in the cross section of the casing, at a desired angle relative to the centrally and longitudinally vertical plane of the rail track on which the casing straddles. Namely, the rolling circuit planes can be positioned horizontally flat or inclined, as seen in the cross section of the casing, in the desired degree and in any direction, viz., downward or upward direction.

(3) The casing body may be assembled from a plurality of portions consisting of a flat deck-shaped portion and a pair of leg-forming portions to form the endless circulating passages for rolling members.

(4) The fastening of the casing body with a pair of side plates, if used, is selectively carried out by either using a combination of a cylindrical projection provided on one part, a projection-receiving hole provided on the other with or without adhesive agent being applied therebetween upon the mating thereof, (5) in place of bearing balls, use may also be made of rollers that are cheaper than balls in manufacture, and, (6) The number of load bearing track grooves provided between the casing and the rail track may be increased as necessary, such as for example, two rows on one side of the track rail with the corresponding rows on the other side of the casing so that not only a four track-type unit but any multitrack units may also be realized according to the present invention.

SUMMARY OF THE INVENTION

The present invention is therefore directed to the following embodiments so as to solve the above-mentioned various disadvantages in the prior art units:

1. A linear motion rolling guide unit made from plastic resin material comprising: a square pillar-shaped long track rail (1) and a casing (2) having an inverse U-shaped cross section and straddling, in a freely slidable fashion, on said track rail (1) with a plurality of rolling members being intervened therebetween, which is characterized in that endless circulating passages for the rolling members formed within the laterally opposite leg portions of said casing (2) have rolling circuit planes lying in a symmetrical relation at an angle $\alpha$ relative to the centrally and longitudinally extending vertical plane of said track rail.

2. A linear motion rolling guide unit made from plastic resin material comprising a square pillar-shaped long track rail (1), a casing (2) having an inverse U-shaped cross section and straddling, in a freely slidable fashion, on said track rail (1) with a plurality of rolling members being intervened therebetween, and a pair of side plates (4) adapted to be fitted onto the longitudinally opposing side walls of said casing, which is characterized in that endless circulating passages for the rolling members are formed within the assembly of said casing and said pair of side plates (4) with the rolling circuit planes of said endless circulating passages lying in an inclined symmetrical relation at an angle α relative to the centrally and longitudinally extending vertical plane of said track rail (1), said side plates (4) are fitted onto the longitudinally opposing side wall surfaces of the casing (2) with the aid of fastening means consisting of a cylindrical male projection and a projection-receiving female hole mating therewith, while a load-bearing track groove (2a) and a rolling member return passage (5) are formed within each of the leg portions of said casing (2) in a parallelly extending relation with each other with arc-shaped direction turning passages (6) being formed on the abutting surfaces of said side plates (4) so as to connect said load-bearing track grooves (2a) and the mating return passage (5) at their both ends to complete an endless rolling member circulating passage.

3. A linear motion rolling guide unit made from plastic resin material comprising a square pillar-shaped long track rail (1), a casing (2) having an inverse U-shaped cross section and straddling, in a freely slidable fashion, on said track rail (1) with a plurality of rolling members being intervened therebetween, and a pair of side plates (4) adapted to be fitted onto the longitudinally opposing side walls of said casing, which is characterized in that endless circulating passages for the rolling members are formed within the assembly of said casing and said pair of side plates (4) with the rolling circuit planes of said endless circulating passages lying in an inclined symmetrical relation at an angle α relative to the centrally and longitudinally extending vertical plane of said track rail (1), a load-bearing track groove (2a) and a rolling member return passage (5) to be connected therewith are formed within each of the leg portions of said casing (2) in a parallelly extending relation with each other with arcuate bridge-shaped U-turn tracks (3d) being formed on the longitudinally opposing side walls of the casing for connecting said load-bearing track groove (2a) and the mating return passage (5) at their both ends, said arcuate-bridge shaped U-turn tracks (3d) are adapted to snugly inserted in snap-fitting relation into horizontally semicircular cross-sectional recesses, respectively, formed on the abutting surfaces of said side plates (4) so as to complete an endless rolling member circulating passage in each of the leg portions (2d) of the casing (2).

4. A linear motion rolling guide unit made from plastic resin material comprising a square pillar-shaped long track rail (1), a casing (2) having an inverse U-shaped cross section and straddling, in a freely slidable fashion, on said track rail (1) with a plurality of rolling members being intervened therebetween, and a pair of side plates (4) adapted to be fitted onto the longitudinally opposing side walls of said casing, which is characterized in that endless circulating passages for the rolling members are formed within the assembly of said casing and said pair of side plates (4) with the rolling circuit planes of said endless circulating passages lying in an inclined symmetrical relation at an angle α relative to the centrally and longitudinally extending vertical plane of said track rail (1), a load-bearing track groove (2a) and a rolling member return passage (5) to be connected therewith are formed within each of the leg portions of said casing (2) in a parallelly extending relation with each other with arcuate bridge-shaped U-turn tracks (3d) being formed on the longitudinally opposing side walls of the casing for connecting said load-bearing track groove (2a) and the mating return passage (5) at their both ends, and said arcuate-bridge shaped U-turn tracks (3d) are adapted to be snugly inserted into horizontally semicircular cross-sectional recesses, respectively, formed on the abutting surfaces of said side plates (4) so as to complete an endless rolling member circulating passage in each of the laterally opposing sides of the assembly of the casing (2) and side plates (4) that have been fitted onto the longitudinally opposing side wall surfaces of the casing (2) with the aid of fastening means consisting of a cylindrical male projection (3a) and a projection-receiving female hole (4a) mating therewith.

5. A linear motion rolling guide unit made from plastic resin material comprising a square pillar-shaped long track rail (1), a casing (2) having an inverse U-shaped cross section and straddling, in a freely slidable fashion, on said track rail (1) with a plurality of rolling members being intervened therebetween, and a pair of side plates (4) adapted to be fitted onto the longitudinally opposing side walls of said casing, which is characterized in that endless circulating passages for the rolling members are formed within the assembly of said casing and said pair of side plates (4) with the rolling circuit planes of said endless circulating passages lying in an inclined symmetrical relation at an angle α relative to the centrally and longitudinally extending vertical plane of said track rail (1), and a load-bearing track groove (2a) and a rolling member return passage (5) to be connected therewith are formed within each of the leg portions of said casing (2) in a parallelly extending relation with each other with arcuate shaped U-turn tracks (3d) being formed on the longitudinally opposing side walls of the casing for connecting said load-bearing track groove (2a) and the mating return passage (5) at their both ends such that into horizontally semicircular cross-sectional recesses respectively formed on the abutting surfaces of said side plates (4) are inserted spacer means having a corresponding but smaller semicircular cross section thereby forming arcuate U-turn passages (6) for rolling members within the respective side plates (4) so as to complete an endless rolling member circulating passage in each of the laterally opposing sides of the assembly of the casing (2) and side plates (4) that have been fitted onto the longitudinally opposing side wall surfaces of the casing (2) with the aid of fastening means consisting of a cylindrical male projection (3a) and a projection-receiving female hole (4a) mating therewith.

BRIEF DESCRIPTION OF THE DRAWINGS

FIG. 3 is a horizontal cross section taken along line A—A on FIG. 2, showing the whole endless ball-circulating passage formed in one of leg portions of the casing 2;

FIG. 4 is a perspective view of the leg portion as shown in FIG. 3 according to the first embodiment of the invention;

FIG. 5 is a frontal view of the second embodiment of the present invention, the rolling circuit planes of the symmetrically arranged endless ball circulating passages on which bearing balls move are inclined at an angle of α;

FIG. 6 is a perspective view of one of the leg portions of the casing of the second embodiment of the present invention, on which is formed the lower half part of an endless ball circulating passage groove;

FIGS. 13 and 14 are schematic diagrams of a side plate fixing and attaching cylindrical projection provided on the longitudinally end wall surfaces of the casing in the second and third embodiments of the present invention wherein FIG. 13 shows a projection having an enlarged tip end and FIG. 14 shows a cylindrical projection having no enlarged peripheral portion.

DETAILED DESCRIPTION OF THE PREFERRED EMBODIMENTS

Figure 1:
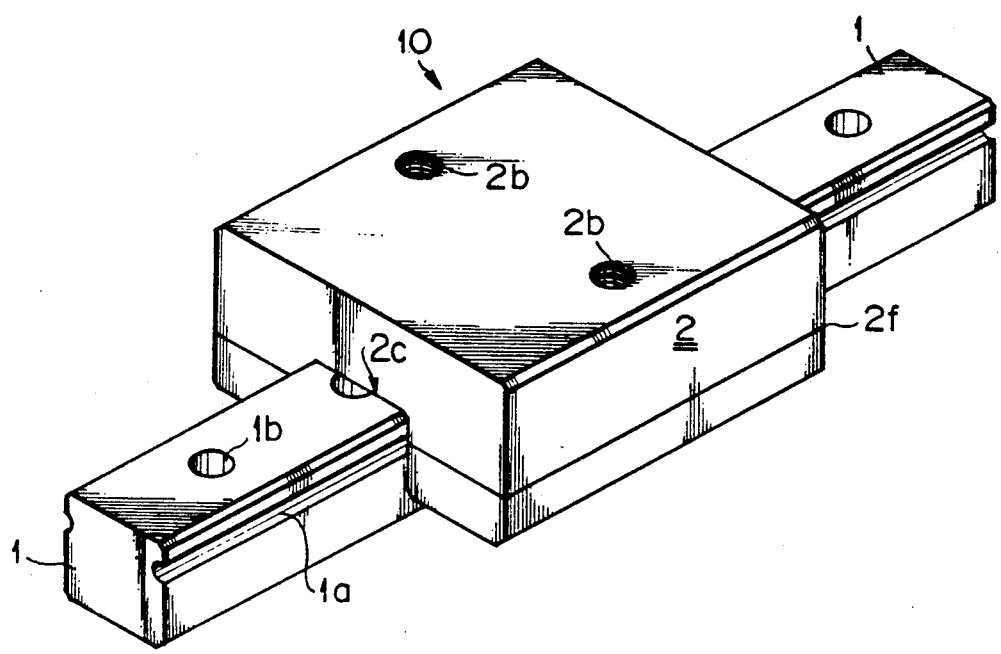
FIG. 1 is a perspective view of the first embodiment of a linear motion rolling guide unit according to the present invention.

FIG. 1 is a perspective view of the first embodiment of a linear motion rolling guide unit 10 according to the present invention. Track grooves 1a for rolling members are formed in the longitudinal direction on both sidewall surfaces of a square pillar-shaped long track rail 1 so as to be symmetrical with respect to the cross section. Reference numeral 2 denotes a generally cubic or rectangular parallelepiped-shaped casing having a lower inner concave portion 2c of a generally inverse U-shaped cross-section which substantially conforms to the square cross-sectional upper portion of the track rail 1, thereby defining laterally opposing leg portions 2d. The casing 2 slidably straddle the upper portion of the track rail 1 at the lower inner concave portion 2c.

Figure 2:
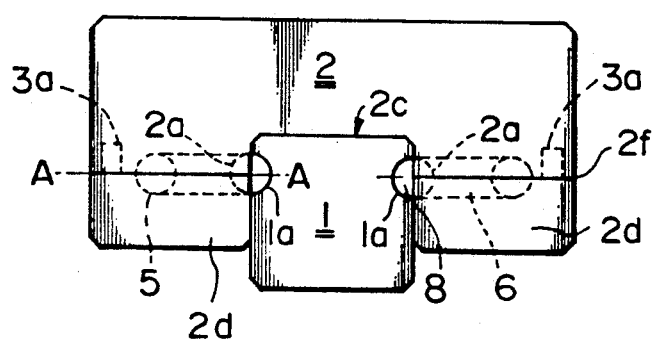
FIG. 2 is a frontal view of FIG. 1 and shows the first embodiment of the invention.

FIG. 2 is a frontal view of the unit of FIG. 1 and shows the first embodiment of the present invention providing, within the casing 2, endless ball circulating passage in each of the laterally opposing leg portions 2d. Corresponding to the rail side track grooves 1a which are provided symmetrically on both side surfaces of the track rail 1 are formed track grooves 2a extending in parallel and in the longitudinal direction on the opposite wall inner surfaces of the laterally opposing legs 2d of the casing, thereby forming the casing-side track grooves 2a. It should be noted that in this embodiment, the endless ball circulating passage as a whole is formed within each of the laterally opposing leg portions 2d of the casing 2, so that the longitudinal length of the casing-side track groove 2a should be shorter than the longitudinal length of the leg portion 2d.

As will be clearly understood from FIG. 3 showing a horizontal section as taken along line A—A on FIG. 2 of a leg portion 2d of the casing 2. As shown in FIG. 2, rolling member return passages 5 are provided in the longitudinal direction in the laterally opposing leg portions 2d of the casing 2 at the horizontal symmetrical positions as seen in the cross section of the casing 2 and, as shown in FIGS. 3 and 4, they extend in parallel along the longitudinal direction with respect to the track grooves 2a of the casing 2 over substantially the same distance. The return passages 5 and the casing-side track grooves 2a are coupled at their longitudinally ends by arc-shaped direction turning passages 6 that are provided within said laterally opposing leg portions 2d at the longitudinally opposing portions, thereby forming a pair of endless circulating passages for rolling balls at the horizontal symmetrical positions on the cross section of the casing 2. A number of rolling members, viz., rolling balls 8 in the case of the present embodiment, are inserted between the opposite rail-side track grooves 1a and the opposite casing-side track grooves 2a, as well as the above-mentioned endless ball circulating passages as shown in FIG. 2 thereby allowing the casing 2 mounted astraddle on the track rail 1 to effect free reciprocating sliding motion on and along the rail.

In the above-mentioned first embodiment, each of the leg portions 2d of the casing 2 is formed by two parts, viz., an upper leg portion and a lower leg portion but without dividing the leg portion, the casing 2 with integral leg portions 2d may be molded as one piece with a pair of symmetrically positioned endless ball circulating passages being formed therewithin.

However, in the following description, the first embodiment will be explained with its casing 2 having a pair of leg portions 2d each consisting of an upper leg portion and a lower leg portion.

FIG. 4 is a perspective view of the leg portion 2d of the casing 2 that has been cut along the line A—A on FIG. 2. It should be noted that the line A—A on FIG. 2 corresponds to a plane vertically bisecting an endless ball circulating passage on which a plurality of balls 8 circulate and therefore on the lower leg portion 2d (FIG. 3) is formed a lower half semicircular cross section of the endless ball circulating passage groove, while in the upper leg portion 2d is provided the corresponding upper half semicircular cross section of the endless ball circulating passage groove with its lower surface being brought into abutting engagement with the mating upper surface of the lower leg portion so that, as shown in FIG. 2, when the lower leg portion is fastened in place with the mating upper leg portion at the line 2f, so as to form a completed endless ball circulating passage within the leg portion 2d.

As shown in FIGS. 1 to 4, the first embodiment providing endless ball circulating passages formed within the leg portions 2d of the casing is featured by a simple and low cost manufacturing due to the reduced number of the parts employed.

However, even in the above-mentioned embodiment, use may be made of side plates on both the opposing end wall surfaces of the casing 2 for improving mechanical strength thereat but such side plates will not be required, when the casing has been made of a resin of high impact and high mechanical strength.

As shown in FIGS. 2, 3 and 4 are provided the mating surfaces of the lower and upper leg portions 2d of the casing 2 with a plurality of generally cylindrical projections 3a and the corresponding number of projection inserting holes 4a each having a diameter slightly smaller than said cylindrical projection 3a at the corresponding positions on the mating surfaces of the lower and upper leg portions so that said two portions may be integrally fastened together in a snap-fitting fashion to form each of the leg portion 2d of the casing 2.

As alternative fastening means of the lower and upper leg portion may be employed adhesive agent applied on the mating surfaces with or without forming the above-mentioned cylindrical projections 3a and the corresponding projection inserting holes 4a.

FIGS. 1 and 4 show a linear motion rolling guide unit having a casing 2, provided with endless ball circulating passages whose rolling circuit planes on which a plurality of balls 8 move are positioned in an inclined symmetrical relation at an angle of 90° relative to the centrally and longitudinally extending vertical plane X—X as shown in FIG. 5 of the track rail 1.

Figure 7:
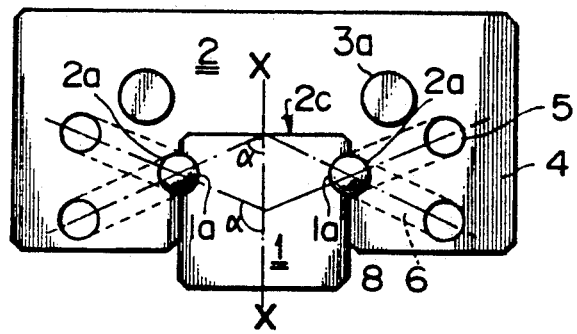
FIG. 7 is a frontal view of the second embodiment with the side plate having been removed for clarity, demonstrating ball circulating planes with a varying angle α relative to the centrally and longitudinally vertical plane X—X of the track rail.

Namely, the rolling circuit planes of this first embodiment extend on a horizontal plane relative to the upper wall surface of the track rail 1. On the other hand, FIGS. 5 to 7 show a linear motion rolling guide unit of the second embodiment according to the present invention wherein the casing 2 is provided with endless ball circulating passages whose rolling circuit planes on which a plurality of balls 8 move are positioned as seen in the cross section, in an inclined symmetrical relation at an angle less than 90° relative to the above-mentioned vertical plane X—X of the track rail 1.

According to the above-mentioned first and second embodiments of the present invention, the casing 2 has a generally parallelepiped shape with a downward opening, lower inner concave portion 2c providing an inverse U-shaped cross section.

In the manufacture of such a casing 2 from plastic resin, it may be molded as either one piece (the first embodiment) or three separate pieces (the second embodiment) to be assembled into an integral casing 2.

In the latter case, the casing 2 may consist of an upper deck-shaped portion and a pair of leg-forming portions 2d. According to the first embodiment, each of the leg portion 2d may have a cubic shape or parallelpiped shape with a semicircular cross-sectional groove to form a horizontal endless ball-circulating path on its flat upper surface, while according to the second embodiment, the leg-forming cubic or parallelepiped parts each have a sloped surface inclined by an angle smaller than 90° as seen in the cross section of the casing 2 and relative to the centrally and longitudinally extending vertical plane X—X in FIG. 5 with an endless ball-circulating path-forming semicircular cross-sectional groove.

On the other hand, the upper deck-shaped part of the casing 2 has, on its lower surface and along the laterally opposing sides, a flat surface (the first embodiment) or inclined abutting surface (the second embodiment) provided with an endless ball-circulating path-forming semicircular cross-sectional grooves to be aligned and assembled with the corresponding semicircular cross-sectional groove of the underlying lower leg potion of the casing 2.

Thus by merely assembling the above-mentioned three parts, viz., a deck-shaped part, and a pair of leg-forming parts 2d, into an integral casing 2, a pair of symmetrically opposing endless ball circulating passages can be easily and simply formed within the casing 2.

Figure 8:
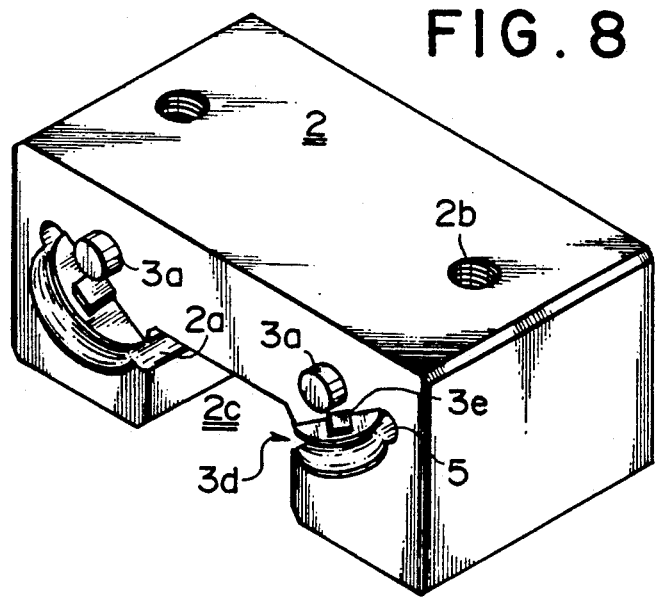
FIG. 8 is a perspective view of a casing in the third embodiment of the present invention.
Figure 10:
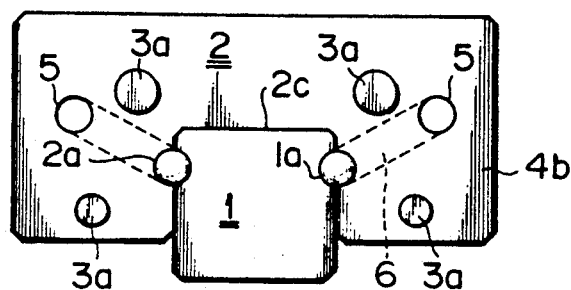
FIG. 10 is a frontal view of the fourth embodiment of the present invention.

FIG. 10 is a frontal view of the unit of FIG. 8 showing the third embodiment of the present invention. Track grooves 2a corresponding to the rail-side track grooves 1a which are provided symmetrically on both side surfaces of the track rail 1 are formed in parallel with the longitudinal axis on the opposite wall inner wall surfaces of laterally opposite leg portions 2d which are defined in the casing 2 by its inner concave portion 2c having the inverse U-shaped cross section. Unlike the first and second embodiments, the casing-side track grooves 2a extend through its longitudinal axis with their extreme ends opening on the longitudinally opposing end wall surfaces of the casing 2. A number of rolling members, in the case of the present embodiment, rolling balls 8 are inserted between the opposite rail-side track groove 1a and the casing-side track groove 2a, thereby allowing the casing 2 mounted over the track rail 1 in straddled fashion to effect free reciprocating sliding motion over the rail.

Figure 9:
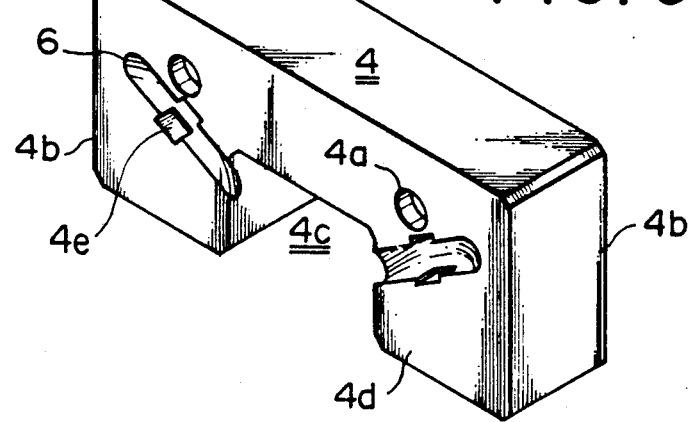
FIG. 9 is a perspective view of a side plate in the third embodiment of the invention.

As shown from FIGS. 8 to 9 showing the casing 2 and side plates 4 of the third embodiment, rolling member return passages 5 are provided in the longitudinal direction in the casing 2 at the horizontal symmetrical positions of the cross section and extend in parallel in the longitudinal direction with respect to the track grooves 2a of the casing 2 with their extreme ends opening on the longitudinally opposing end wall surfaces of the casing 2. The return passages 5 and the track grooves 2a are coupled at their longitudinal ends by direction turning passages 6 formed within the mating side plates 4, which will be explained hereinbelow, thereby forming a pair of endless ball circulating passages for the rolling members at the horizontal symmetrical positions on the cross section of the casing 2.

The side walls 4 each having ball direction turning passages 6 (FIG. 9) are adapted to be fixed on to the longitudinally opposite end walls of the casing 2. As shown in FIG. 9, the direction turning passages 6 are formed from notches each having a semicircular horizontal cross section with a width enough to pass the rolling members as well as a peripheral track groove and extend in the longitudinal direction and, as seen on the cross section of the side plates 4, at the horizontal symmetrical positions, that is, in both leg portions 4b of the side plates 4. On the other hand, arcuate bridge-shaped U-turn tracks 3d each with a peripheral track groove are integrally formed on the longitudinally opposing end wall surfaces of the casing 2 as shown in FIG. 8 at the positions corresponding to the notches formed in the mating side plates 4. Each of the bridge-shaped U-turn tracks 3d has a semicircular horizontal cross section essentially similar to that of the notch to be snugly fitted within the notches formed in the side plates 4. Each of the U-turn tracks 3d may have different sizes depending on the necessity of fixing projections 3a to be provided on the side plates 4 about which will be explained in more detail in the followings:

Namely, the arcuate bridge-shaped U-turn track 3d may take a substantially the same or slightly larger width than the width of the mating notch so that the former may snugly be fitted into the mating notch of side plate in a simple snap-pressing action so as to form an endless ball circulating passage between the facing peripheral track grooves of U-turn track 3d and notch. In this case, the projections 3a and the mating holes 4a on FIGS. 8 and 9 may be omitted.

The endless ball circulating passages formed in the manner as mentioned above have rolling circuit planes lying in an inclined symmetrical relation at an angle smaller than 90° relative to the centrally and longitudinally extending vertical plane (X—X on FIG. 7) of the track rail 1, so that the arcuate bridge-shaped U-turn tracks 3d are likewise formed on the longitudinally opposing end wall surfaces of the casing in an inclined symmetrical relation at the same angle relative to the above-mentioned vertical plane X—X of the track rail 1.

According to the above-mentioned embodiment, it is clear that the side plates 4 can be simply press-fitted onto the longitudinally opposing end walls of the casing 2 in a snap-fitting fashion while at the same time forming the arc-shaped direction turning passages 6 for rolling members 8.

Namely, the arcuate-shaped bridges 3d may be concentrically inserted into the notches that are formed on the respective side plates in an inclined symmetrical relation at the same angle as shown in FIG. 9, thereby forming the arc-shaped direction turning passages 6 of the rolling balls between both the casing 2 and the side plate 4.

When the side plates 4 are joined and fixed to both the longitudinally opposing end walls of the casing 2 in a snap-fitting manner according to the above-mentioned third embodiment, it is necessary that the bridge-shaped U-turn tracks 3d are securely fitted into the notched portions of the side plates 4 and the complete arc-shaped direction turning passages 6 are formed in the side plates 4. For this purpose, a pair of positioning guides 3e may be formed on the longitudinally opposing end wall surfaces of the casing 2 and adjacent to or on both sides of the bridge-shaped U-turn track 3d as shown in FIG. 8, while a pair of positioning guide grooves 4e (FIG. 9) conforming to the guides 3e are formed in the upper and lower edge portions adjacent the notched openings on the side wall surfaces of the side plate 4.

Alternatively or at the same time, cylindrical projections 3a which will be explained hereinafter, and snap-fitting type projection inserting holes 4a conforming to the projections 3a may be formed on the abutting end surfaces of the casing 2 and each of the side plates 4, thereby enabling the casing 2 and side plates 4 to be fixedly joined and attached in a snap-fitting manner. Such projections 3a may be provided on the longitudinally opposing end walls of the casing in the number and positions as desired.

Such a fixed joint as being realized by the above-mentioned embodiments can be accomplished only by forming the casing 2 and side plates 4 by plastic resin. As shown in FIG. 9, the side plate 4 is provided with a cross-sectional shape substantially conforming to the cross-sectional shape of the casing 2. The arc-shaped direction turning passages are completed by the snap-fitting engagement between the casing 2 and side plates 4 as mentioned above.

It should be noted that the linear motion rolling guide unit of the present invention is characterized in that almost all of the component parts of the unit, that is, the track rail 1, casing 2, side plates 4, and the like are made of high performance engineering plastic such as PEEK resin, PES resin, PPS resin, PI resin, PAI resin, modified PPO resin, PEI resin, etc. Therefore, the snap-fitting engagement of the arcuate bridge-shaped U-turn tracks 3d into the corresponding notches of the side plates 4 thereby forming direction turning passages 6 in the side plates 4 can be simply and securely realized. In the manner similar to the above and, at the same time, the side plates 4 can also be fixedly attached to the longitudinally opposing end wall surfaces of the casing 2 by a simple method.

As shown in FIGS. 8 and 9, when the casing 2 is molded by a resin, a plurality of generally cylindrical projections 3a projecting in the longitudinal direction may be integrally formed at predetermined positions on the longitudinally opposing end wall surfaces of the casing 2. As shown in FIG. 9, the projection inserting holes 4a for receiving the cylindrical projections 3a in a snap-fitting manner are provided by molding on one of the side wall surface of the side plate 4 which is to be joined with the end wall surface of casing 2 at the positions corresponding to the mating projections 3a. The corresponding projections 3a and inserting holes 4a are joined in a snap-fitting manner when the casing 2 and the side plates 4 are joined, since the overall diameters of the projections 3a or 3b are generally made slightly larger than those of the mating inserting holes 4a. Thus, the side plates 4 can be fixed to both end wall surfaces of the casing 2 in the simplest possible operation. The casing-side track grooves 2a and the relative ball return passages 5 are coupled at their both extreme ends by arcuate ball direction turning passages 6 which are in turn constructed by associating notches formed on both side plates 4 with the arcuate bridge-shaped U-turn track 3d provided on the longitudinally opposing end wall surfaces of the casing, thereby completing endless ball circulating passages therebetween.

Figure 13:
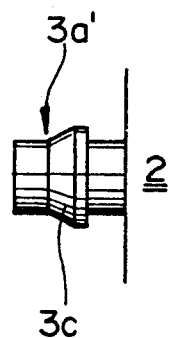
Figure 15:
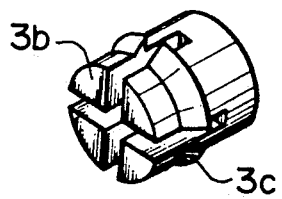
FIG. 15 is a perspective view of the deformed fixing and attaching projection of FIGS. 13.

The snap-fitting type joint fixing method as used in the present invention is a well-known technique in itself and widely used. For instance, in the case of the cylindrical projections 3a of the present invention, as shown in FIGS. 13 and 15, an enlarged diameter portion is provided on the outer peripheral surface of the tip end of the projection, a plurality of which may be integrally molded on the casing end wall surface. The projection inserting hole 4a having an inner diameter which is adapted to a snap-fitted engagement to the enlarged diameter portion 3c of the projection 3a is formed on one of the side wall surfaces of the side plate 4. The above snap-fitting type joint can be simply and easily performed by engaging the cylindrical projections 3a and the projection inserting holes 4a.

Figure 14:
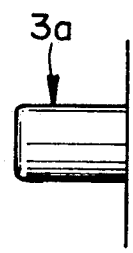

FIG. 14 is a cylindrical projection having no enlarged tip end portion with a flat peripheral surface. This type of projection 3a may be used together with a projection receiving hole 4a having a slightly larger diameter than that of the mating projection. This type of fastening means is useful only for aiming at a precise indexing of casing 2 with side plates attached to the end wall surfaces thereof, while the two parts may be joined with or without the use of adhesive.

FIG. 15 shows another embodiment of a cylindrical projection of the present invention. To increase the fastening strength between the projection and the receiving hole, a diameter of the enlarged portion 3c of the tip end portion of a cylindrical projection is made greater. For this end, a cross slit 3b is formed as in FIG. 15 in the tip end portion of the projection 3a, thereby increasing the elastic deforming rate of the tip end portion. With such a structure, the plastic deformation which might occur when the tip end portion of the projection 3a is forcibly fitted into the projection inserting hole 4a can be prevented.

Figure 11:
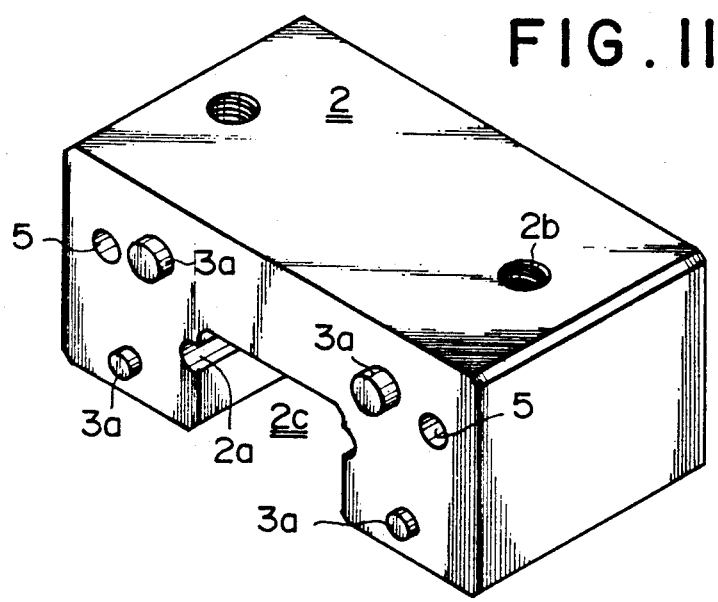
FIG. 11 is a perspective view of the casing of the fourth embodiment.
Figure 12:
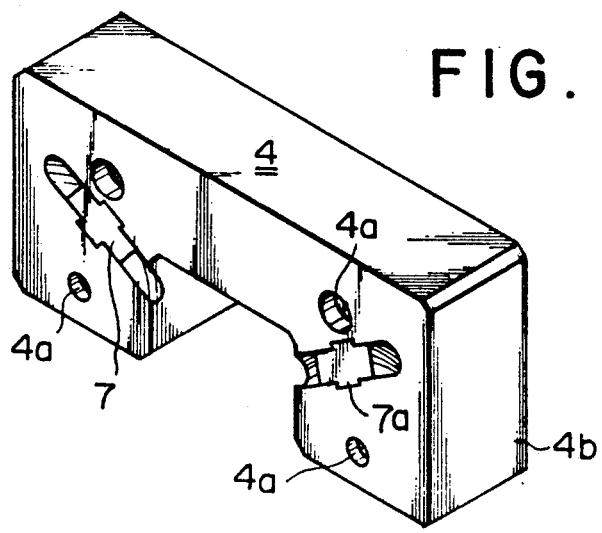
FIG. 12 is a perspective vie of a side plate with a spacer being inserted in the semicircular shaped cross-sectional notch and adapted to be brought into abutting engagement with one side of the casing showing the fourth embodiment of the present invention.

FIGS. 11 to 12 show the fourth embodiment of the present invention, employing a more simplified snap-fitting type joint fixing between the casing 2 and the side plate 4.

Like the above-mentioned embodiments, in FIGS. 11 and 12 also, the parts having the same constructions as those employed in the foregoing embodiments are designated by the same reference numerals. Only in the manner of the formation, in the side plates 4, of the direction turning passages for rolling members, the fourth embodiment differs from the third embodiment.

A special construction of the fourth embodiment of the present invention excluding the constructions common to those in the first to third embodiments will now be described with reference to the attached drawings.

Explaining the construction of the fourth embodiment of the invention, as shown in FIGS. 11 and 12, direction turning passages 6 are provided in each of the side plates 4 to be fixed onto the longitudinally opposing end walls of the casing 2. Each of the direction turning passages 6 is so formed in the side plates 4 that a notch having a semicircular horizontal cross section with a peripheral track groove and a width enough to pass the rolling members is first formed extending in the longitudinal direction at each of the symmetrical positions on the cross section of the side plate 4, that is, in each of both the leg portions 4b of the side plate 4. Such a construction is similar to that in the second embodiment, however, in the fourth embodiment, a separate circulating passage spacer 7 providing a peripheral track groove and having a semicircular horizontal cross section of a small diameter than that of the notch is concentrically inserted into the notch, thereby forming an arc-shaped direction turning passage 6 for rolling members 8 in each of the side plates 4. In the present embodiment as shown in FIG. 12, the base portion of the circulating passage spacer 7 is provided with a pair of opposing flange portion 7a. The spacer 7 is fitted and fixed in a snap-fitting manner into the mating engaging recess having a shape similar to the flange portion 7a and formed in the opposing edge portions of the notch. Such a fixing joint can be realized by forming both the side plates 4 and the spacers 7 from plastic resin. As shown in FIG. 12, each side plate 4 has a cross section conforming with the cross section of the casing 2. The arc-shaped direction turning passages 6 are formed by a snap-fitting engagement of the casing 2 with the mating side plates 4 thereby integrally and securely attaching them together. Thus, endless ball circulating passages for rolling members can be formed within the units 10.

Like the foregoing embodiments, the fourth embodiment of the invention is also characterized in that almost all of the component parts of the unit 10, that is, the track rail 1, casing 2, side plate 4, circulating spacers 7 forming the direction turning passages 6 of rolling members in the side plates 4, and the like are made of high performance engineering plastics such as PEEK resin, PES resin, PPS resin, PI resin, PAI resin, modified PPO resin, PEI resin, and the like. Therefore, the spacers 7 can be brought into engagement with the side plates 4 in a snap-fitting manner. Similar to the above-mentioned third embodiment, the side plates 4 can be securely attached to the longitudinally opposing end wall surfaces of the casing 2 by a simple method.

As in the foregoing embodiment, when the casing 2 is molded with a resin, a plurality of generally cylindrical projections 3a (refer to FIGS. 13 to 15) which project at appropriate positions from the longitudinally opposite end wall surfaces of the casing 2 are integrally formed by molding. As having been explained relative to the foregoing third embodiment, the corresponding projections 3a and inserting holes 4a are joined in a snap-fitting manner, thus the two parts to be joined can be securely fixed on to each other by a simplest operation.

It should be appreciated that the method for assembling a casing body from a plurality of parts and the fixing method of the side plates with the casing according to the present invention are not limited to the above-mentioned embodiments only but any of the well-known snap-fitting type fixing methods can be likewise employed.

For instance, in not only the first embodiment but all the other embodiments, the upper and lower leg portions of the casing 2 may be connected according to the afore-mentioned surface-to-surface bonding with adhesive or so-called "male-female connection" consisting of a projection and a receiving hole mating therewith with the use of either snap-fitting connection or adhesive bonding, which may be desirably selected depending on the materials and purposes of the units.

On the other hand, although balls are used as rolling members in the respective embodiments according to the present invention, rolling rollers can also be used in a similar and slightly modified construction. Therefore, the present invention can be applied to various kinds of linear motion rolling guide units.

Furthermore, to prevent bearing balls falling out from the endless ball circulating passages when the casing is removed from the track rail, the width of the casing-side track groove 2a may be made slightly smaller than the diameter of the balls, which is an obvious embodiment according to the present invention.

Throughout the foregoing first to fourth embodiments, almost all of the component parts of the unit 10, that is, the track rail 1, casing 2, side plate 4, circulating spacers 7 forming the direction turning passages 6 of rolling members in the side plates 4, and the like are made of high performance engineering plastics such as PEEK resin, PES resin, PPS resin, PI resin, PAI resin, modified PPO resin, PEI resin, and the like, while the rolling members may also be formed not only from plastic resins but also from stainless steel, glass, ceramics.

In the above-mentioned embodiments, a symmetrically arranged two-track rail-type casing was employed but a four-track rail-type casing may also be likewise employed so as to enhance load resistance of the unit.

In the foregoing embodiments, the rolling circuit planes defined by the respective endless circulating passages for rolling members which are provided in laterally symmetrical relation with each other in the casing are positioned, as seen in the cross section of the casing, in an inclined symmetrical relation at an angle ($\alpha$) equal to or smaller than 90° relative to the centrally and longitudinally extending vertical plane X—X of the track rail but as seen in FIG. 7, the rolling circuit planes may take any angle such as even greater than 90°, with the direction turning passages being inclined at the same angle.

The present invention is not limited to the foregoing embodiments but many modifications and variations are possible within the spirit and scope of the appended claims of the invention. Namely, the present invention also includes in its technical scope that regarding the second embodiment, the arcuate bridge-shaped U-turn track 3d may be modified in the configuration as will be obvious in the art so far as it achieves the same or a similar action.

Further, in the respective embodiments according to the present invention, it is apparent that a plurality of generally cylindrical projections 3a may be provided on one of the side wall surfaces of the side plate 4, while at the corresponding positions on the mating end wall surface of the casing 2 are provided the mating porjection-receiving holes 4a.

Like the above-mentioned prior art linear motion rolling guide units, substantially all the constitutional parts of the present units are manufactured from a high performance engineering resin, therefore the latter also attain all the technical effects created by the prior art unit, such as, for example, snap-fitting engagement between casing and side panel, simplification of working procedures in the manufacture of the respective constitutional parts, marked reduction in the number of the constitutional parts, and reduction in weights and manufacturing costs of the finished products.

The technical effects created by the present invention which cannot be attained by the prior art unit may be mentioned as follows:

1) According to one of the embodiments of the present invention, side plates for fixing onto casing are not always necessary so that the unit body can be greatly minimized. Only in the case where the casing is required to be mechanically reinforced, use may be made of such side plates, 2) the rolling circuit planes of the respective endless circulating passages for rolling members may be inclined, as seen in the cross section of the casing, at a desired angle relative to the longitudinally central vertical plane of the track rail, thereby enabling the whole body size of casing to be reduced to the minimum, 3) the casing body can be molded in one piece or in plural pieces to be assembled into an integral casing body with endless ball circulating passages being formed simultaneously with the assembling, 4) depending on operative application for the units may be selectively used different kinds of adhesive agents for assembling the casing body, 5) in place of rollers, use may be made of rollers, thereby increasing load resistance, and decreasing manufacturing costs of the finished units, and 6) by designing the unit as a four-track type or multi-track type, load resistance of the units can be desirably intensified.

What is claimed is:

1. A linear motion rolling guide unit made from plastic resin material comprising:

a square pillar-shaped long track rail (1) and a casing (2) having an inverse U-shaped cross section and straddling, in a freely slidable fashion, on said track rail (1) with a plurality of rolling members being intervened therebetween, which is characterized in that endless circulating passages for the rolling members formed within the laterally opposite leg portions of said casing (2) having rolling circuit planes lying in a symmetrical relation at an angle α relative to the centrally and longitudinally extending vertical plane of said track rail, each of said endless circulating passages for rolling members being defined by assembling two parts having abutting surfaces on which are formed a pair of mating semicircular cross-sectional grooves extending along said endless circulating passages.

2. A linear motion rolling guide unit made from plastic resin material as claimed in the claim 1, wherein the above-mentioned two parts providing the above-mentioned abutting surfaces are joined together with fastening means provided thereon in the vicinity of said semicircular cross-sectional grooves, said fastening means consisting of a cylindrical male projection and a projection-receiving female hole.

3. A linear motion rolling guide unit made from plastic resin material as claimed in claim 1, wherein said rolling members are balls made of a material selected from the group consisting of plastics, stainless steel, glass, ceramics.

4. A linear motion rolling guide unit made from plastic resin material as claimed in claim 1, wherein said track rail (1), casing (2), side plates (4), and circulating passage spacers (7) are made of high performance engineering plastics selected from the group consisting of PEEK resin, PES resin, PPS resin, PI resin, PAI resin, denaturation PPO resin, PEI resin.

5. A linear motion rolling guide unit made from plastic resin material as claimed in claim 2, wherein said fastening means consists of a cylindrical male projection (3a) extending longitudinally from each of the abutting surfaces of the side walls of the casing (2) and a projection receiving female hole (4a) formed on each of the abutting surfaces of the side plates (4) at the positions corresponding to said cylindrical male projections (3a), while said cylindrical male projection (3a) and the corresponding female hole (4a) are fastened with the aid of an adhesive upon they have been mated with each other.

6. A linear motion rolling guide unit made from plastic resin material as claimed in claim 2, wherein said fastening means consists of a cylindrical male projection (3a) having an enlarged forward end and extending longitudinally from each of the abutting surfaces of the side walls of the casing (2) and a projection receiving female hole (4a') having a diameter slightly smaller than that of the forward end of the cylindrical projection (3a') and formed on each of the abutting surfaces of the side plates at the positions corresponding to said cylindrical male projections (3a), while said cylindrical male projection (3a) and the corresponding female hole (4a) are fastened in a snap-fitting fashion upon they have been mated with each other under pressure.

7. A linear motion rolling guide unit comprising:
(a) a track rail;
(b) a side unit having laterally opposite leg portions adapted to straddle said track rail;
(c) a plurality of rolling members adapted to be carried between said track rail and said slide unit so that said slide unit may slide freely,
said slide unit comprising endless circulating passages for said rolling members, said passages being formed within said leg portions of said slide unit having rolling circuit planes lying in a symmetrical relation at an angle α relative to the centrally and longitudinally extending vertical plane of said track rail,
each of said endless circulating passages being defined by two parts having abutting surfaces with mating semicircular cross-sectional grooves therein; and
(d) fastening means for joining said two parts, said fastening means comprising a cylindrical male projection and a corresponding female receptacle in said abutting surfaces.

8. The linear motion rolling guide unit as defined in claim 7 wherein said sliding unit comprises a casing and plural side plates.

9. The linear motion rolling guide unit as defined in claim 7, wherein said track rail and said slide unit comprise a plastic resin material selected from the group consisting of PEEK resin, PES resin, PPS resin, PI resin, PAI resin, denaturation PPO resin, PEI resin.

10. The linear motion rolling guide unit as defined in claim 7 wherein said rolling members are balls made of a material selected from the group consisting of plastics, stainless steel, glass and ceramics.

11. The linear motion rolling guide unit as defined in claim 7 wherein said male projection has an end portion with a diameter larger than the diameter of the corresponding female receptacle so that the male projection is adapted to be snapped into the female receptacle and held therein with pressure.

12. The linear motion rolling guide unit as defined in claim 7 wherein said male projection and said female receptacle are fastened with an adhesive.

13. The linear motion rolling guide unit as defined in claim 7 wherein said angle $\alpha$ is less than ninety degrees.

* * * * *